(12) United States Patent
Church

(10) Patent No.: US 10,839,572 B2
(45) Date of Patent: Nov. 17, 2020

(54) CONTEXTUAL VIRTUAL REALITY INTERACTION

(71) Applicant: Flyinside, Inc., Troy, NY (US)

(72) Inventor: Daniel Church, Troy, NY (US)

(73) Assignee: FLYINSIDE, INC., Troy, NY (US)

( * ) Notice: Subject to any disclaimer, the term of this patent is extended or adjusted under 35 U.S.C. 154(b) by 0 days.

(21) Appl. No.: 15/453,264

(22) Filed: Mar. 8, 2017

(65) Prior Publication Data

US 2017/0263033 A1 Sep. 14, 2017

Related U.S. Application Data

(60) Provisional application No. 62/306,402, filed on Mar. 10, 2016.

(51) Int. Cl.
| | |
|---|---|
| *G06T 11/60* | (2006.01) |
| *G06T 19/00* | (2011.01) |
| *G06F 3/01* | (2006.01) |
| *G06F 3/0481* | (2013.01) |
| *G06F 3/0482* | (2013.01) |

(Continued)

(52) U.S. Cl.
CPC .............. *G06T 11/60* (2013.01); *G06F 3/011* (2013.01); *G06F 3/017* (2013.01); *G06F 3/0481* (2013.01); *G06F 3/0482* (2013.01); *G06F 3/04812* (2013.01); *G06F 3/04815* (2013.01); *G06F 3/04842* (2013.01); *G06T 19/006* (2013.01); *G02B 27/01* (2013.01); *G02B 2027/0187* (2013.01); *G06F 3/012* (2013.01); *G06F 3/013* (2013.01); *G06F 3/0484* (2013.01)

(58) Field of Classification Search
CPC ..................................................... G06F 3/0481
See application file for complete search history.

(56) References Cited

U.S. PATENT DOCUMENTS 6,277,384 B1 * 8/2001 Kaiko ...................... A61P 29/00
424/400
9,165,605 B1 * 10/2015 Friedman ............... G11B 27/02
(Continued)

OTHER PUBLICATIONS

Mdbuehler, Real life flying vs Virtual Reality , Sep. 13, 2015, Youtube.*

(Continued)

*Primary Examiner* — Ming Wu
(74) *Attorney, Agent, or Firm* — McInnes & McLane, LLP

(57) ABSTRACT

A system for integrating an application within a virtual reality presentation invokes the virtual reality presentation in a virtual reality presentation device. The virtual reality presentation is an instance of a virtual reality application executing in the virtual reality presentation device. The system invokes the application within a non-virtual reality application environment. The system integrates the application within the virtual reality presentation by rendering an instance of the application as a virtual window layered on the virtual reality presentation. The system renders a list of applications within the virtual reality presentation device. The system receives, from a user, a selection from the list, and integrates the selected application within the virtual reality presentation by rendering a respective instance of the selected application as a respective virtual window layered on the virtual reality presentation.

23 Claims, 16 Drawing Sheets
(14 of 16 Drawing Sheet(s) Filed in Color)

(51) Int. Cl.
*G06F 3/0484* (2013.01)
*G02B 27/01* (2006.01)

(56) References Cited

U.S. PATENT DOCUMENTS

| | | | |
|---|---|---|---|
| 2010/0178644 A1 | 7/2010 | Meglan et al. | |
| 2014/0078176 A1* | 3/2014 | Kim | G06F 3/017 |
| | | | 345/633 |
| 2015/0145887 A1 | 5/2015 | Forutanpour et al. | |
| 2015/0332463 A1* | 11/2015 | Galera | G06K 9/00201 |
| | | | 382/103 |
| 2016/0027214 A1 | 1/2016 | Memmott et al. | |
| 2016/0062540 A1* | 3/2016 | Yang | G06F 3/0481 |
| | | | 345/173 |
| 2017/0003764 A1 | 1/2017 | Li | |
| 2018/0286053 A1 | 10/2018 | Labbe et al. | |
| 2018/0302569 A1 | 10/2018 | Cabral et al. | |

OTHER PUBLICATIONS

Real life flying vs Virtual Reality , Mdbuehler , Sep. 13, 2015, https://www.youtube.com/watch?v=30pSJ0wOB6U (Year: 2015).*
Church, Daniel, "FlyInside FSX Virtual Desktop + Leap Motion Demo," youtube, Jul. 27, 2015, 5 pages, XP054977323, Retrieved from the Internet: URL:https://youtu.be/TXnu39EzmzY?t=31s (Retrieved on May 9, 2017).
International Search Report for corresponding PCT Application No. PCT/US2017/021337, dated May 18, 2017, 6 pages.
Mdbuehler: "Real life flying vs Virtual Reality—Oculus Rift DK2 / FSX / FlyInside FSX," youtube, Sep. 13, 2015, 4 pages, XP054977338, Retrieved from the Internet, URL:https://youtu.be/30pSJ0wOB6U?t=54s, (retrieved on May 10, 2017).
Church, Dan DCOC Oculus DK2 Support for Flight Simulator X Preview, Feb. 23, 2015.
Church, Dan "DCOC v2 Prepar3D with Oculus Rift DK2, now improved!", https://www.youtube.com/watch?v=VZj0PUDC--8, Sep. 19, 2014.
Church, Dan "FlyInside FSX—Using Flight Simulator X in the Oculus Rift DK2, new features!", https://www.youtube.com/watch?v=VZj0PUDC--8, Mar. 11, 2015.
Godin, Guy "Virtual Desktop Tech Demo", https://www.youtube.com/watch?v=JynN5mmZ0KQ, Sep. 9, 2014.
Church, Daniel, "DCOC v2 Prepar3D with Oculus Rift DK2, now improved!", https://www.youtube.com/watch?v=Kc7LOAeL45Y, Sep. 19, 2014.
Church, Daniel, "Kickstarter Project: FlyInside FSX," Jun. 30, 2015, 18 pages, Retrieved from the Internet: URL: www.kickstarter.com/projects/1232710074/flyinside-fsx (Retrieved Sep. 3, 2019).
International Preliminary Report on Patentability for PCT/US2017/021337 dated Sep. 11, 2018, 10 pages.
Non-Final Office Action in U.S. Appl. No. 16/003,859—dated Jul. 30, 2019.
Written Opinion for PCT/US2017/021337 dated May 18, 2017, 9 pages.

* cited by examiner

CONTEXTUAL VIRTUAL REALITY INTERACTION

CROSS-REFERENCE TO RELATED APPLICATIONS

This application claims the benefit of priority to U.S. Provisional Patent Application No. 62/306,402, filed Mar. 10, 2016, and entitled "Contextual Virtual Reality Interaction", the entire contents of the application being incorporated herein by reference in its entirety.

BACKGROUND

Virtual reality software applications display an instance of the virtual reality application within a virtual reality headset. Desktop applications execute on a computer, outside of the virtual reality headset. A user trying to operate both types of applications would have to switch between operating the virtual reality application within the virtual reality headset, and operating the desktop application on the computer. Therefore, it would be helpful to operate, and interact with a desktop application from within the virtual reality headset.

SUMMARY

According to one embodiment disclosed herein, in a method for integrating an application within a virtual reality presentation, the method invokes the virtual reality presentation in a virtual reality presentation device. The virtual reality presentation is an instance of a virtual reality application executing in the virtual reality presentation device. The method invokes the application within a non-virtual reality application environment. The method integrates the application within the virtual reality presentation by rendering an instance of the application as a virtual window layered on the virtual reality presentation.

In one aspect of embodiments disclosed herein, the method receives user interaction with the virtual window, to remove the virtual window from the virtual reality presentation while the application continues to execute within the non-virtual reality application environment.

In one aspect of embodiments disclosed herein, the method links a plurality of virtual reality presentations each comprising at least one virtual window. Each respective user of each of the plurality of virtual reality presentations can view at least one virtual window within any of the plurality of virtual reality presentations.

In one aspect of embodiments disclosed herein, the method renders a list of applications within the virtual reality presentation device, and receives, from a user, selection of at least one selected application from the list of applications. The method integrates at least one selected application within the virtual reality presentation by rendering a respective instance of at least one selected application as a respective virtual window layered on the virtual reality presentation.

In one aspect of embodiments disclosed herein, when the method integrates at least one selected application within the virtual reality presentation, for each of the selected application, the method performs the following steps. The method renders the selected application in the non-virtual reality application environment without any other application obscuring a presentation of the selected application. The method captures a screenshot of the non-virtual reality application environment. The method crops the screenshot to frame only the presentation of the selected application within the non-virtual reality application environment. The method then renders the cropped presentation of the selected application within the virtual reality presentation as the virtual window.

In one aspect of embodiments disclosed herein, the method iteratively renders the selected application, captures, crops, and renders the cropped presentation to provide the user with real time interaction with the virtual window within the virtual reality presentation device while the selected application executes within the non-virtual reality application environment in response to the user's real time interaction.

In one aspect of embodiments disclosed herein, the method detects a user cursor on the virtual window, and prioritizes the iteratively rendering of the selected application over any other selected applications within the virtual reality presentation device.

In one aspect of embodiments disclosed herein, the method maximizes a number of respective virtual windows created for each selected application by rendering as many of the selected applications as possible in the non-virtual reality application environment without any other applications obscuring the respective presentations of the selected applications prior to capturing the screenshot of the non-virtual reality application environment.

In one aspect of embodiments disclosed herein, when the method crops the screenshot to frame only the presentation of the selected application within the non-virtual reality application environment, the method obtains coordinates of the presentation of the selected application with respect to the non-virtual reality application environment. The method then crops the screenshot using the coordinates to frame only the presentation of the selected application.

In one aspect of embodiments disclosed herein, the method receives a user's interaction with the virtual window as user interaction with the application.

In one aspect of embodiments disclosed herein, when the method receives the user's interaction with the virtual window as user interaction with the application, the method receives selection of a command within the virtual window as the user's interaction. The method executes the command within the application, and renders a result of the command execution within the virtual window.

In one aspect of embodiments disclosed herein, the method receives selection of a command within the application. The method executes the command within the application, and renders a result of the command execution within the virtual window.

In one aspect of embodiments disclosed herein, when the method integrates the application within the virtual reality presentation by rendering an instance of the application as a virtual window, the method provides an element on the virtual window allowing the user to manipulate the virtual window within the virtual reality presentation device when the user maneuvers a cursor on the element. The method reduces an area covered by the virtual window within the virtual reality presentation device when the user maneuvers the cursor off the element.

According to one embodiment disclosed herein, in a method for rendering controls within a virtual reality presentation, the method renders a two dimensional control associated with an application as a three dimensional control within the virtual reality presentation. The method provides three dimensional interaction with the three dimensional control within the virtual reality presentation.

According to one embodiment disclosed herein, a method links a plurality of virtual reality presentations. Each respective user of each of the plurality of virtual reality presentations can view at least two of the plurality of virtual reality presentations.

System and computer program products corresponding to the above-summarized methods are also described and claimed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

Various aspects of at least one embodiment are discussed below with reference to the accompanying figures, which are not necessarily drawn to scale, emphasis instead being placed upon illustrating the principles disclosed herein. The figures are included to provide an illustration and a further understanding of the various aspects and embodiments, and are incorporated in and constitute a part of this specification, but are not intended as a definition of the limits of any particular embodiment. The figures, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure.

Figure 1:
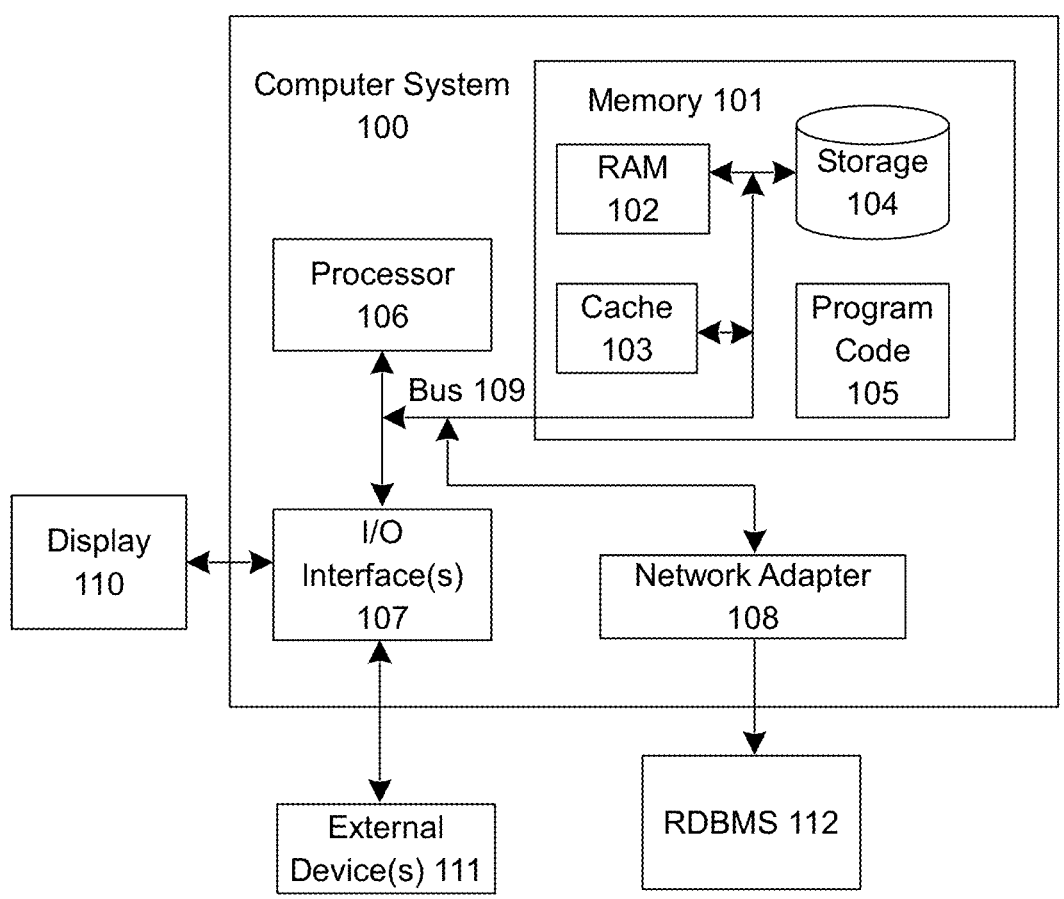

FIG. 1 illustrates a system for integrating an application within a virtual reality presentation, according to embodiments disclosed herein.

Figure 2:
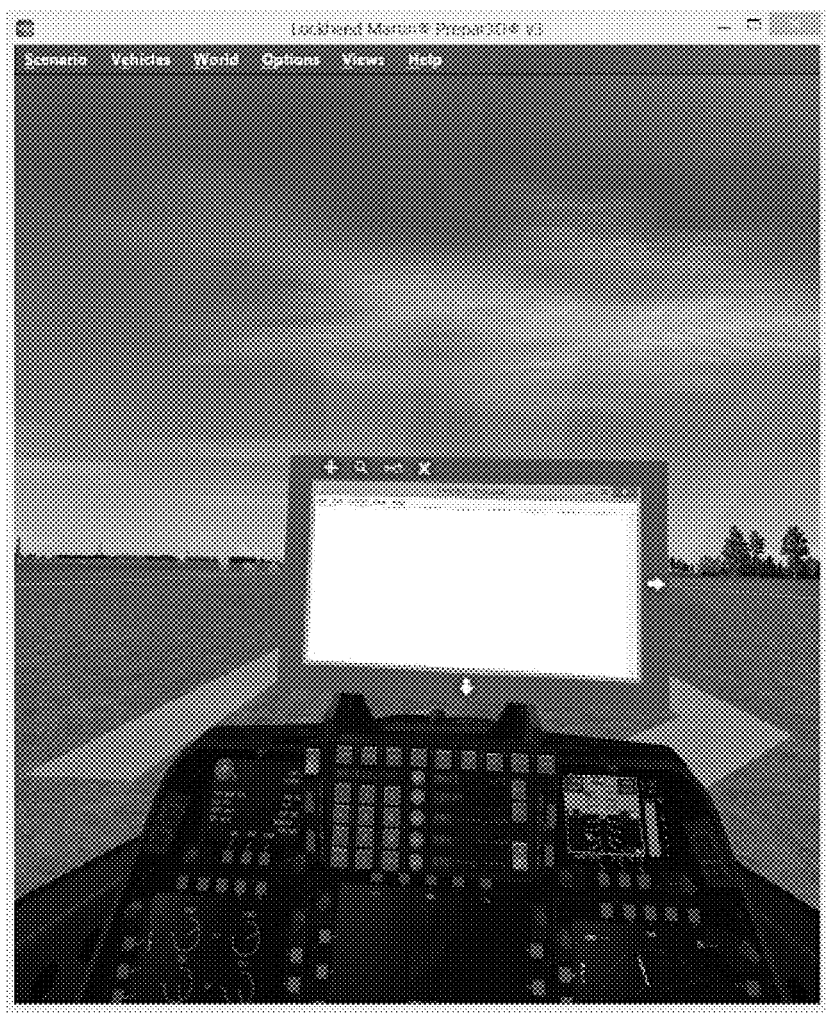

FIG. 2 illustrates an example screenshot of a virtual reality application executing along with an instance of a desktop application rendered as a virtual window, according to embodiments disclosed herein.

Figure 3:
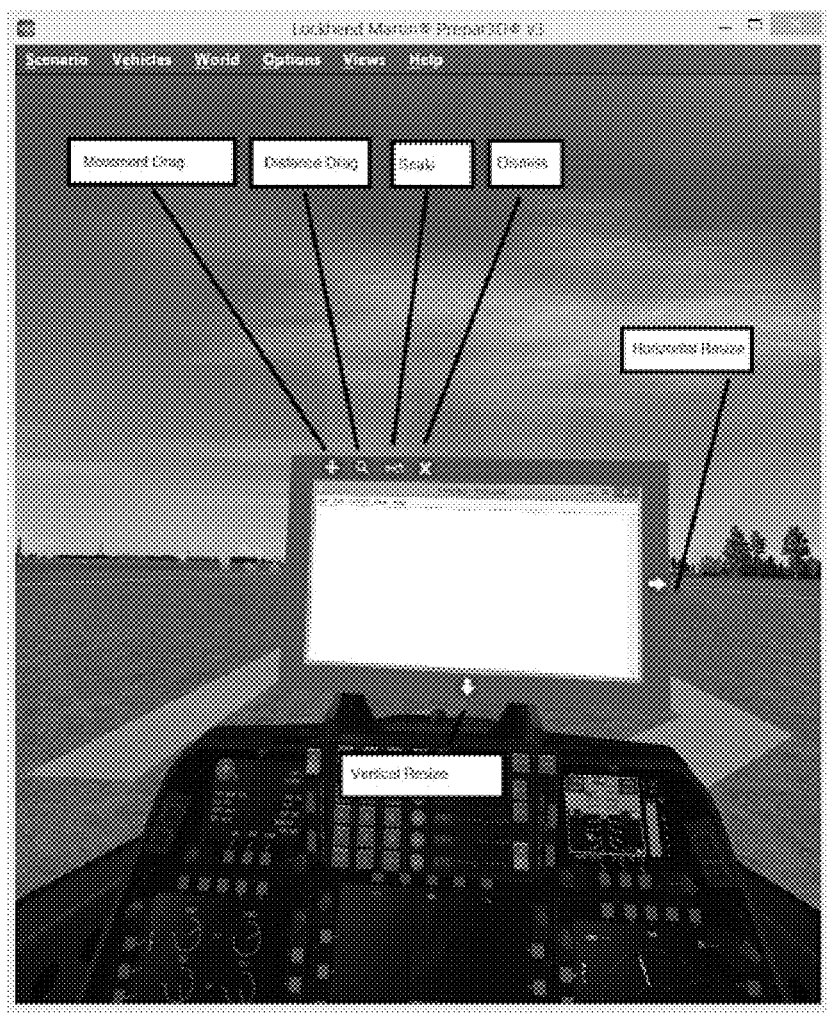

FIG. 3 illustrates an example screenshot of a virtual reality application executing along with an instance of a desktop application rendered as a virtual window, where the virtual window is labeled with tools to manipulate the virtual window, according to embodiments disclosed herein.

Figure 4:

FIG. 4 illustrates an example screenshot of a virtual reality application and a desktop application both executing on a desktop computer, according to embodiments disclosed herein.

Figure 5:
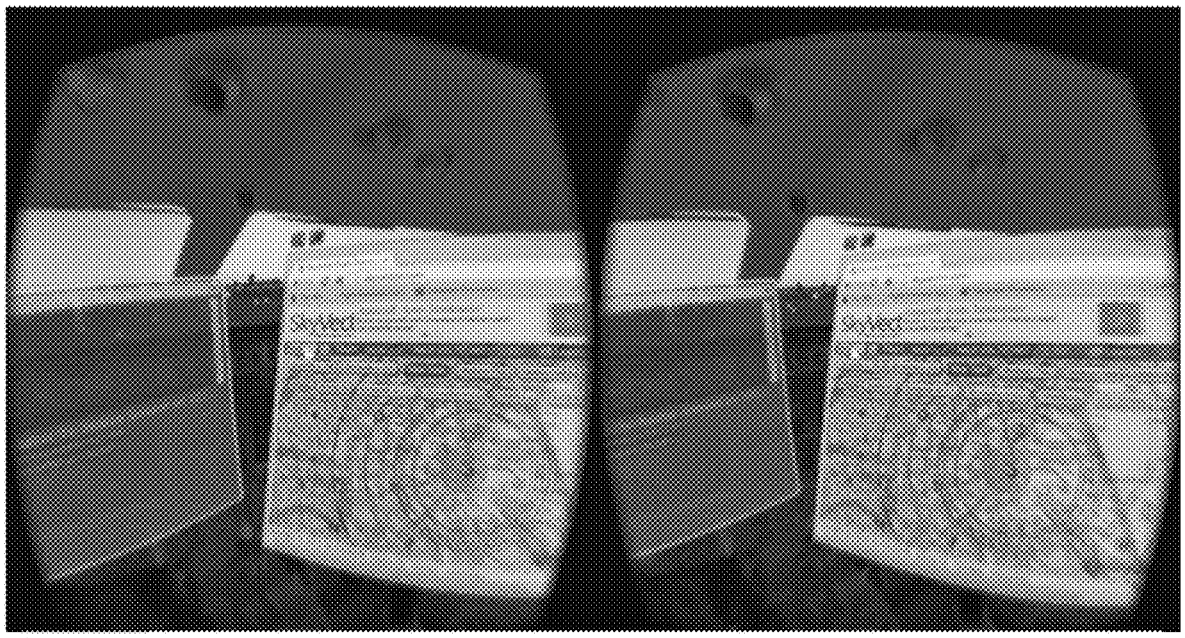

FIG. 5 illustrates an example screenshot of a virtual reality application executing along with an instance of a desktop application rendered as a virtual window, and a portion of the virtual reality application executing as a virtual reality window within itself, according to embodiments disclosed herein.

Figure 6:

FIG. 6 illustrates an example screenshot of a virtual window created by the virtual reality application without a desktop application as a source, according to embodiments disclosed herein.

Figure 7:
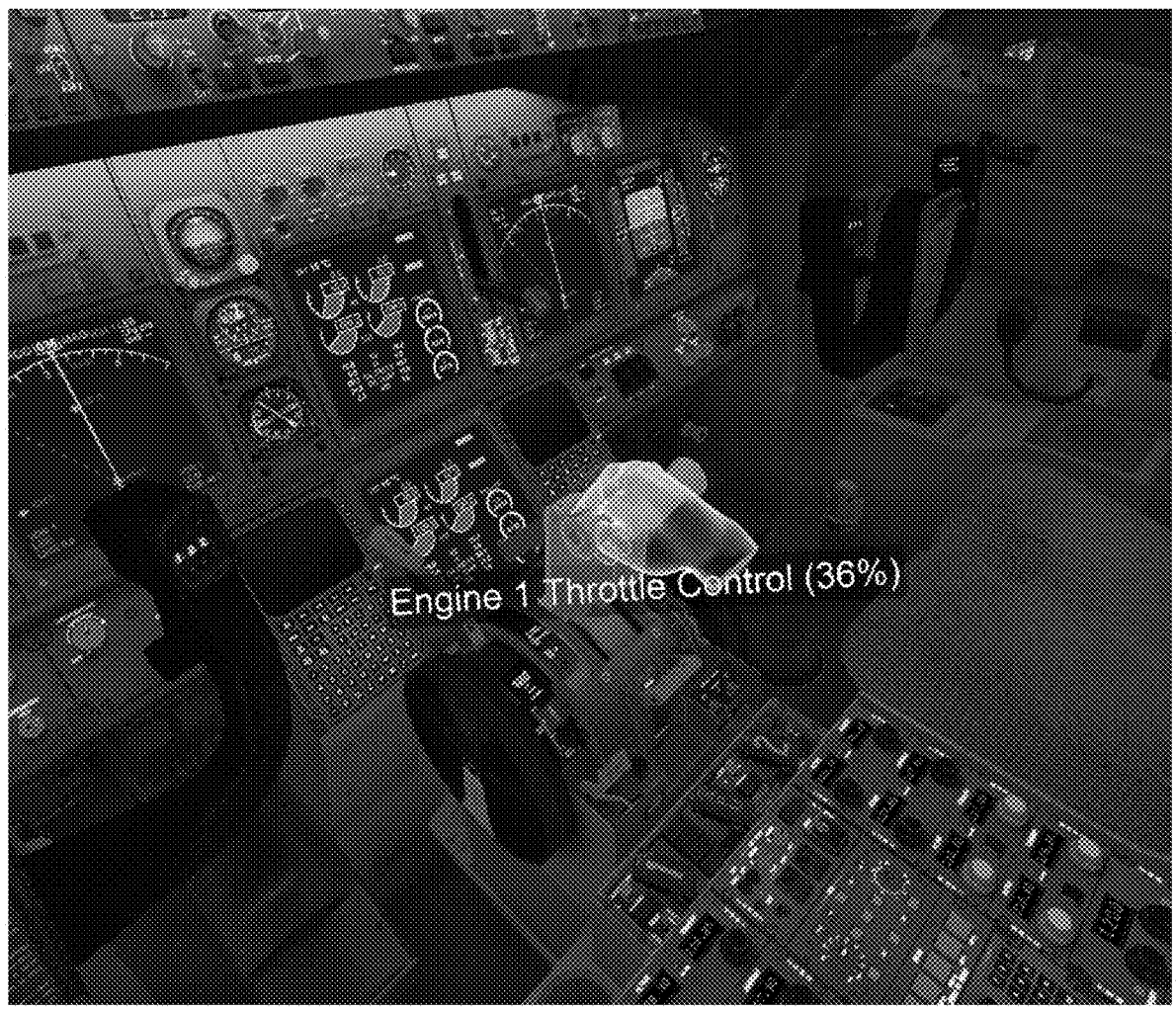

FIG. 7 illustrates an example screenshot of a virtual reality application illustrating an inferred three dimensional path for the virtual engine level, allowing a user to grab and move the virtual engine lever using hand-tracking technology, according to embodiments disclosed herein.

Figure 8:

FIG. 8 illustrates an example screenshot of a virtual reality application with multiple users accessing the same virtual reality presentation, each using their own virtual reality presentation device, according to embodiments disclosed herein.

Figure 9:

FIG. 9 illustrates an example screenshot of a virtual reality presentation with example three dimensional controls generated using the three dimensional analysis engine, according to embodiments disclosed herein.

Figure 10:

FIG. 10 illustrates an example screenshot of a virtual reality application executing along with an instance of a camera feed rendered as a virtual window, and a three dimensional control, according to embodiments disclosed herein.

Figure 11:
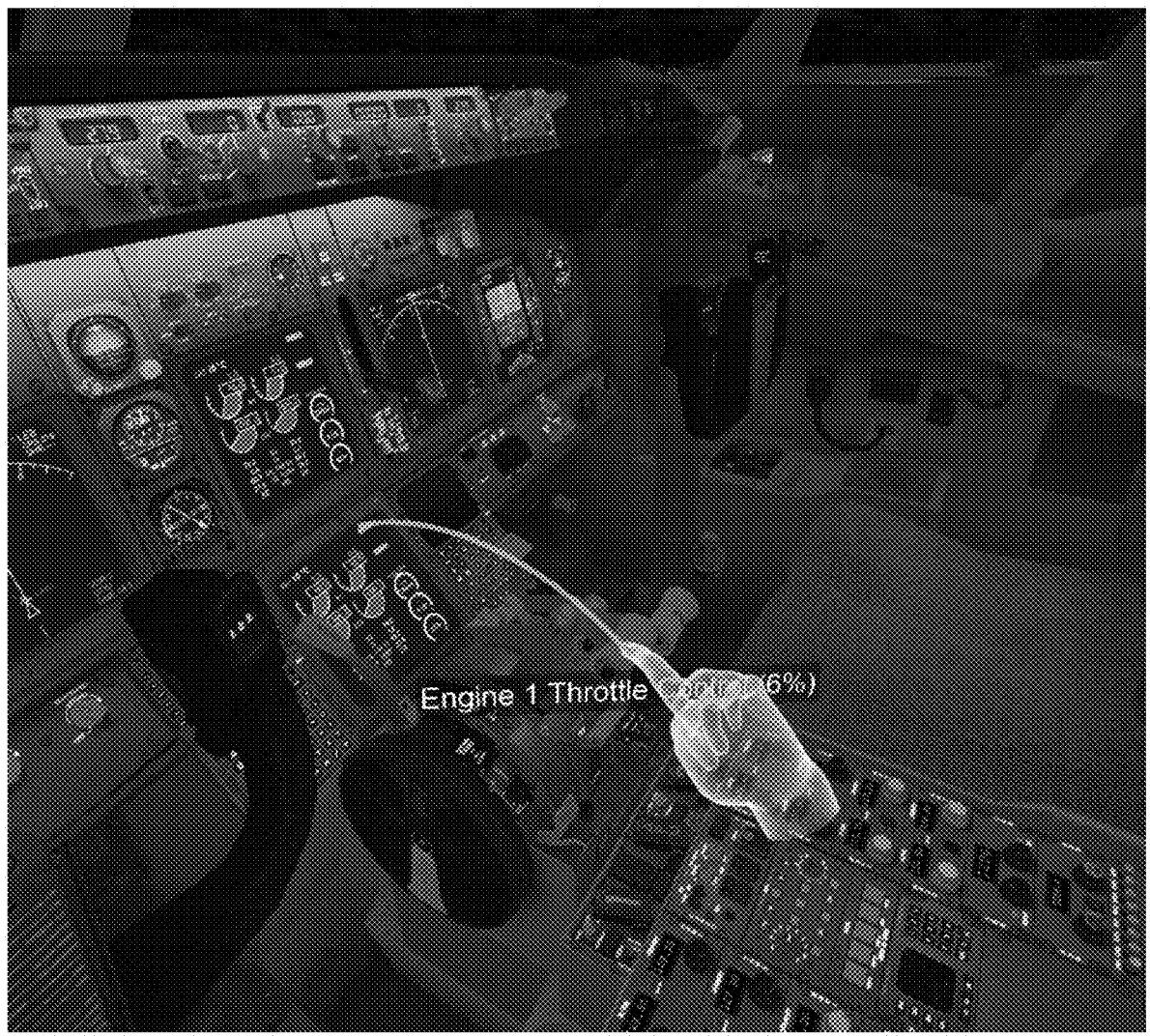

FIG. 11 illustrates an example screenshot of a virtual reality application executing, with an indication of how a user can manipulate a three dimensional control that was created from a two dimensional model of the control, according to embodiments disclosed herein.

Figure 12:
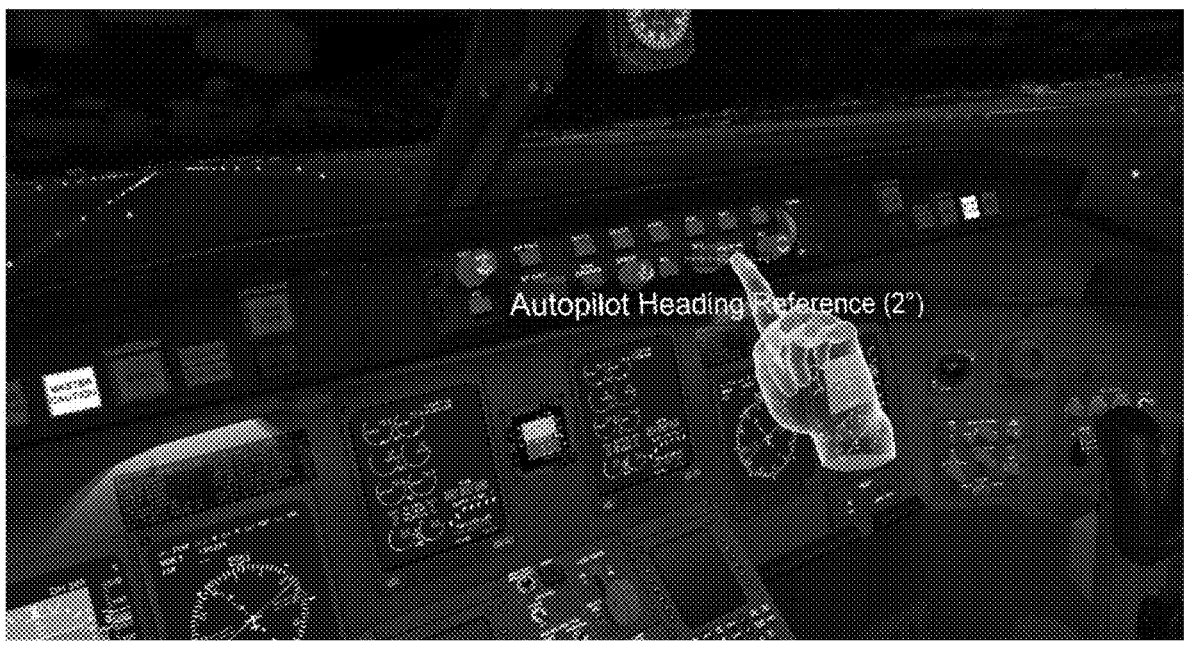

FIG. 12 illustrates an example screenshot of a virtual reality application executing with an optimized two dimensional control, according to embodiments disclosed herein.

Figure 13:
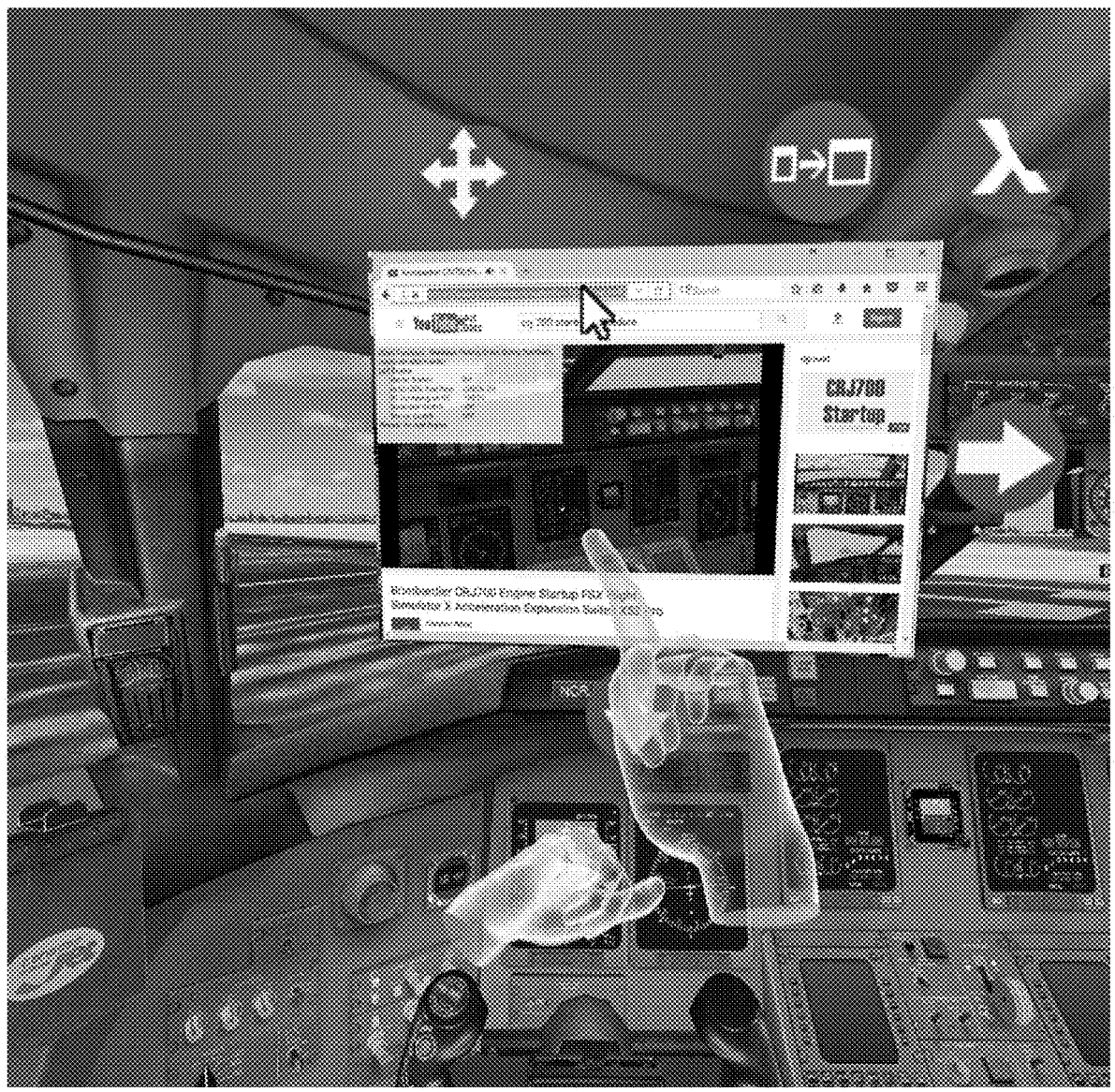

FIG. 13 illustrates an example screenshot of a virtual reality application executing along with an instance of a desktop application rendered as a virtual window, and a user interacting with the virtual window, according to embodiments disclosed herein.

Figure 14:

FIG. 14 illustrates an example screenshot of a virtual reality application executing along with an instance of a desktop application rendered as a virtual window, and a user manipulating a cursor within the virtual window, according to embodiments disclosed herein.

Figure 15:

FIG. 15 illustrates an example screenshot of a virtual reality representation with a control optimized using the three dimensional path technology, according to embodiments disclosed herein.

Figure 16:
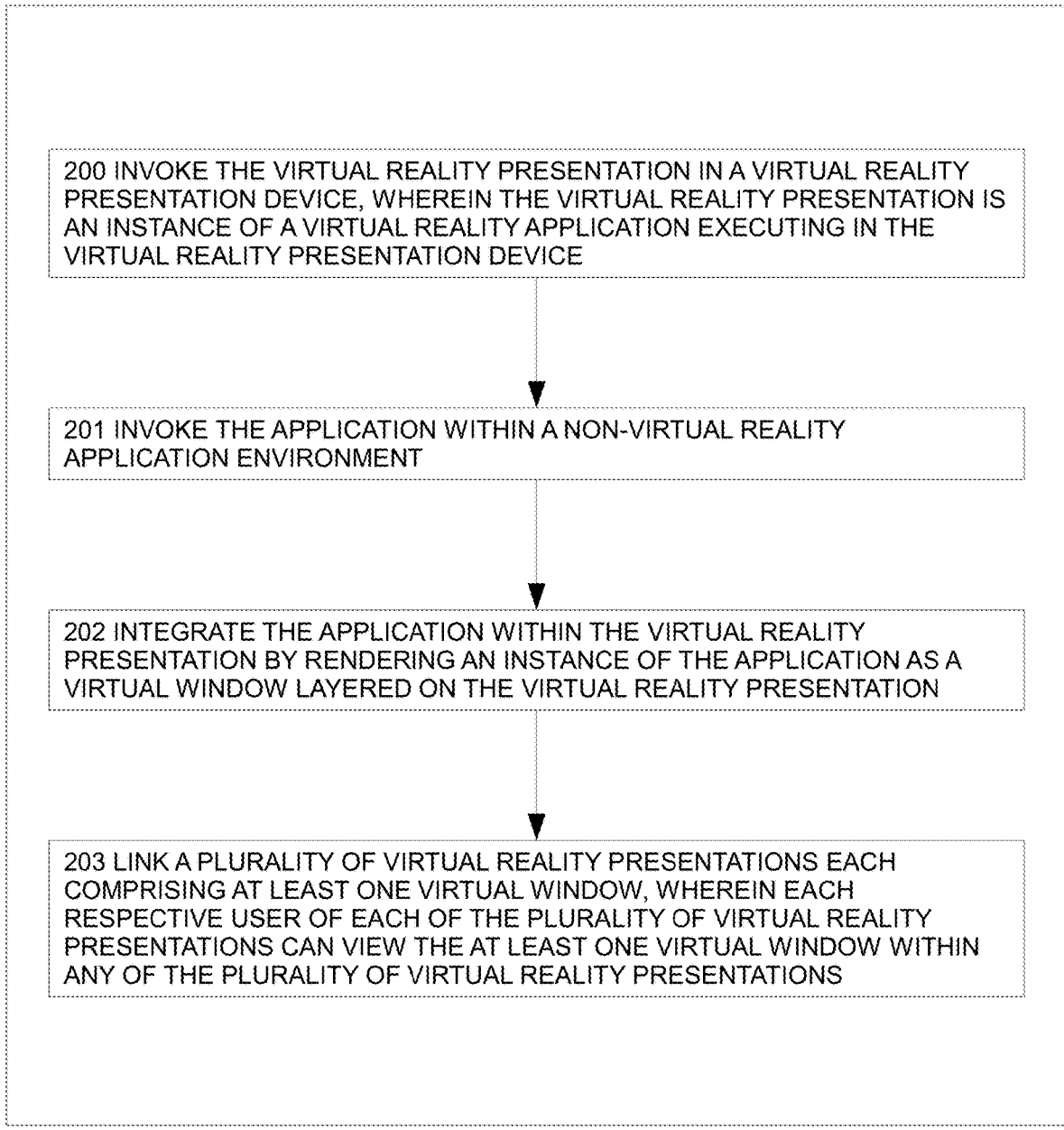

FIG. 16 is a flowchart illustrating an embodiment of a method for integrating an application within a virtual reality presentation, according to embodiments disclosed herein.

DETAILED DESCRIPTION OF THE ILLUSTRATIVE EMBODIMENTS

Embodiments disclosed herein provide a method for integrating an application within a virtual reality presentation. The following description is presented to enable one of ordinary skill in the art to make and use embodiments disclosed herein, and are provided in the context of a patent application and its requirements. Various modifications to the embodiment will be readily apparent to those skilled in the art and the generic principles herein may be applied to other embodiments. Thus, embodiments disclosed herein are not intended to be limited to the embodiment shown but is to be accorded the widest scope consistent with the principles and features described herein. The examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting.

Embodiments disclosed herein can take the form of an entirely hardware embodiment, an entirely software embodiment or an embodiment containing both hardware and software elements. In a preferred embodiment, embodiments disclosed herein are implemented in software, which includes but is not limited to firmware, resident software, microcode, etc.

Furthermore, embodiments disclosed herein can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of embodiments disclosed herein. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 illustrates a system for integrating an application within a virtual reality presentation, according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or with one or more external devices 111, such as a display 110, via I/O interfaces 107. The memory 101 may include computer readable media in the form of volatile memory, such as random access memory (RAM) 102 or cache memory 103, or non-volatile storage media 104. The memory 101 may include at least one program product having a set of at least one program code modules 105 that are configured to carry out the functions of embodiments of the present invention when executed by the processor 106. The computer system 100 may communicate with one or more networks via network adapter 108. The computer system 100 may communicate with one or more databases 112 via network adapter 108.

FIG. 2 illustrates an example screenshot of a virtual reality application executing along with an instance of a desktop application rendered as a virtual window. The desktop application, executing on a desktop computer is integrated into the virtual reality presentation as the virtual window.

FIG. 3 illustrates an example screenshot of a virtual reality application executing along with an instance of a desktop application rendered as a virtual window, where the virtual window is labeled with tools to manipulate the virtual window, such as "Movement Drag", "Distance Drag", "Scale", "Dismiss", and Horizontal Resize".

FIG. 4 illustrates an example screenshot of a virtual reality application and a desktop application both executing on a desktop computer. The virtual reality application executes, for example, on a desktop computer, and the virtual reality presentation is rendered within the virtual reality presentation device. In other words, the virtual reality application executes on a desktop computer, and the user interacts with the virtual reality application using, for example, a virtual reality headset.

FIG. 5 illustrates an example of a virtual reality application executing along with an instance of a desktop application rendered as a virtual window, and a portion of the virtual reality application executing as a virtual reality window within itself. An alternate user interface is also presented.

FIG. 6 illustrates an example virtual window created by the virtual reality application. The virtual window is created without a desktop application as a source, and blends in seamlessly within the virtual reality environment.

FIG. 7 illustrates an example screenshot of a virtual reality application illustrating an inferred three dimensional path for the virtual engine level, allowing a user to grab and move the virtual engine lever using hand-tracking technology executing with a three dimensional control. The method infers a three dimensional path from, for example, the aircraft model. This allows the user to grab and move the virtual engine lever using hand-tracking technology.

FIG. 8 illustrates an example screenshot of a virtual reality application with multiple users accessing the same virtual reality presentation, each using their own virtual reality presentation device. The method combines the three dimensional analysis engine with three dimensional path technology, and network communications. This allows two users using two different computers, each using their own virtual reality presentation devices (i.e., headsets) in a shared environment (meaning they are both linked over a network interacting with the same virtual reality presentation) to each manipulate the three dimensional controls within the virtual reality presentation using virtual reality hand-tracking. In this example embodiment, each user is represented by a different colored hand.

FIG. 9 illustrates an example screenshot of a virtual reality presentation with example three dimensional controls generated using the three dimensional analysis engine.

FIG. 10 illustrates an example screenshot of a virtual reality application executing along with an instance of a camera feed rendered as a virtual window, and a three dimensional control. In one example embodiment, the user accesses the live feed from a website. The method then creates the virtual window using the "screen capture and crop" process from the website that is rendered on the desktop computer. In another example embodiment, the webcam video data may be streamed from the webcam to the graphics card on the computer executing the virtual reality application. The method then creates the virtual window from the webcam data on the graphics card. In other words, the virtual window may be created directly from the webcam data or even using webcam data that comes over a network. In this example scenario, the webcam data is transmitted from a network card (from the sender computer) to at least one other network card (the receiver computer), to a graphics card (on the receiver's computer) and then the method creates a virtual window from the received webcam data. An example of this scenario might be a flight student receiving instructions from a flight instructor (webcam data) across the world, where a live feed of the flight instructor is rendered as a virtual window within the flight student's virtual reality representation device.

FIG. 11 illustrates an example screenshot of a virtual reality application executing with an indication of how a user can manipulate a three dimensional control that was created from a two dimensional model of the control. The method analyzes the two dimensional model of the control to predict, for example, the path of a throttle lever. The method then creates a three dimensional control that allows the user to grab and drag the virtual throttle lever.

FIG. 12 illustrates an example screenshot of a virtual reality application executing with an optimized two dimensional control. For example, the method analyzes the two dimensional model of the control to create a three dimensional version of the control. If the method determines, for example, that the three dimensional path gesture for the control is inconvenient, the method optimizes the control. In this example scenario, the method determines that a virtual slider track is a better presentation than, for example, a three dimensional path gesture, and renders the control within the virtual reality presentation as a two dimensional virtual slider track. The user may drag a finger along the virtual slider track to operate the control within the virtual reality presentation.

FIG. 13 illustrates an example screenshot of a virtual reality application executing along with an instance of a desktop application rendered as a virtual window, and a user interacting with the virtual window. The user may use virtual reality hand-tracking to tap on the virtual window. The method receives that tapping action and performs that tap/selection/on the desktop application executing on the desktop computer.

FIG. 14 illustrates an example screenshot of a virtual reality application executing along with an instance of a desktop application rendered as a virtual window, and a user manipulating a cursor within the virtual window.

FIG. 15 illustrates an example screenshot of a virtual reality representation with a control optimized using three dimensional analysis engine. The three dimensional analysis engine determines an improved control for the user. Using a virtual reality flight simulator as an example, the three dimensional analysis engine analyzes the aircraft to find flight controls that a user would interact with. The three dimensional analysis engine requests from a three dimensional path system to generate the three dimensional path that the flight control would move along. The three dimensional analysis engine then analyzes the three dimensional path, and determines whether to use the three dimensional path generated by the three dimensional analysis engine. If the three dimensional analysis engine determines that the three dimensional path is inconvenient for the user, the method then determines an optimized path. In yet another example, some virtual reality controls are designed for a user to interact with the control in two dimensions. A two dimensional throttle control may have a user clicking on an "increase throttle" button to increase the throttle setting. The method uses heuristics to determine a three dimensional gesture that a user can use to simulate increasing the throttle setting. The method performs this determination for different types of controls. The method may analyze, for example, the size of the click zones, the size of the control within the virtual reality representation, the directions in which the object/control might move, etc. The method then determines the most convenient representation of that control for the user. That representation might be a control to click, or twist, etc. The most convenient representation is chosen for the user based on the properties of the control/object. FIG. 15 illustrates a radio panel control chosen to represent a two dimensional radio input control. As a complex control, it may be inconvenient to represent the radio input control as a control with a drag gesture. A two dimensional system might represent this radio input control as a slider control. Here, the method represents the radio input control as a radio station virtual window (i.e., an optimized control) so that a user may manipulate the values more fluidly.

In a method for integrating an application within a virtual reality presentation, as illustrated in FIG. 16, at 200 the method invokes the virtual reality presentation in a virtual reality presentation device, where the virtual reality presentation is an instance of a virtual reality application executing in the virtual reality presentation device. For example, the virtual reality application executes on a desktop computer, and displays an instance of the virtual reality application (as a virtual reality presentation) within the virtual reality presentation device (i.e., a virtual reality headset). When the instance of the virtual reality application is executing, a user experiences/interacts with the virtual reality presentation using the virtual reality presentation device. The virtual reality presentation device may be an Oculus Rift, HTC Vive, a Head Mounted Display (HMD), etc. At 201, the method invokes the application within a non-virtual reality application environment. The application may be any application that is not executing within the virtual reality presentation device. That is, the application may be a desktop application, a mobile application, another virtual reality application, etc. The term "desktop application" is used herein to describe any software application other than the virtual reality application (that is currently executing within the virtual reality presentation device), but a desktop application doesn't necessarily need to be executing on a desktop computer. At 202, the method then integrates the application within the virtual reality presentation by rendering an instance of the application as a virtual window layered on the virtual reality presentation as illustrated in FIGS. 2, and 5-6. In other words, the method integrates desktop applications within a virtual reality application by displaying a virtual window of the desktop application in the virtual reality presentation, and allowing the user to interact with the virtual window just as if the user were interacting with the desktop application on the desktop computer.

In an example embodiment, the method renders a list of applications within the virtual reality presentation device. For example, the user is presented with a list of available and/or running desktop applications within the virtual reality presentation device. The list may be rendered within the virtual reality presentation device, or may be rendered on the desktop computer. The method receives, from the user, a selection of at least one of the application from the list of applications (i.e., at least one selected application). The user may make the selection from within the virtual reality presentation device, or from the desktop application executing on the desktop computer. The user may make a selection of any of the applications within the list to integrate an instance of that desktop application into the virtual reality presentation. The method then integrates the selected application(s) within the virtual reality presentation by rendering a respective instance of each of the selected application(s) as a respective virtual window layered on the virtual reality presentation. The instance of the desktop application is rendered as the virtual window within the virtual reality presentation (layered on top of the virtual reality representation) while for example, the application, such as a desktop application, runs on the desktop computer. The user may select several of the applications from the list, and an instance of each application selected will be rendered as a virtual window (of the respective selected application) within the virtual reality presentation. The user may interact with any of these virtual windows just as if the user were interacting with the associated desktop application.

In an example embodiment, when the method integrates at least one selected application within the virtual reality presentation, the method creates the virtual window from a screen capture of the selected application executing on the non-virtual reality application environment, for example, a desktop application running on the desktop computer. The method maintains a list of the desktop applications selected (by the user), and cycles through the list. For each of the selected applications, the method renders the selected application in the non-virtual reality application environment without any other application obscuring a presentation of the selected application. For example, the method uses an Application Programming Interface (API), system calls, or other methods of control within the operating system or environment (for example, a Windows API) to move the selected desktop application in front of any other desktop applications that are currently executing on the desktop computer. The method captures a screenshot (i.e., a screen capture) of the non-virtual reality application environment. The method crops the screenshot to frame only the presentation of the selected application within the non-virtual reality application environment (i.e., the desktop screen of the desktop computer). The method then renders the cropped presentation of the selected application within the virtual reality presentation as the virtual window. In other words, for each desktop application selected, the method moves the presentation of the desktop application on the desktop screen so that no other desktop application is blocking the desktop application presentation. The method then takes a screenshot of the entire desktop, and crops the screenshot to display only the desktop application presentation. That cropped presentation is then integrated within the virtual reality presentation device (i.e., the headset) as the virtual window.

In an example embodiment, when the method crops the screenshot to frame only the presentation of the selected application within the non-virtual reality application environment, the method obtains coordinates of the presentation of the selected application with respect to the non-virtual reality application environment. The method then crops the screenshot using the coordinates to frame only the presentation of the selected application. In other words, the method calculates the coordinates (with respect to the desktop screen) of the selected desktop application. The method crops a picture of the selected desktop application from the screenshot using the calculated coordinates such that only an image of the desktop application is framed within the cropped image. The method renders the cropped picture of the selected desktop application as a virtual window within the virtual reality presentation. The method uses standard virtual reality rendering techniques to render the cropped picture as a virtual window.

In an example embodiment, the method iteratively renders the selected application, captures, crops, and renders the cropped presentation to provide the user with real time interaction with the virtual window within the virtual reality presentation device while the selected application executes within the non-virtual reality application environment in response to the user's real time interaction. For example, for each selected desktop application, the method performs the steps of rendering the desktop application in front of any other desktop applications that are opened on the desktop computer, calculating coordinates of the desktop application with respect to the screen of the desktop computer, capturing a screenshot, cropping a picture of the selected desktop application from the screenshot to create the virtual window, and integrating the virtual window within the virtual reality presentation. Repeatedly performing these steps at a fast rate produces a smooth experience of the desktop application rendered as a virtual window within the virtual reality presentation. The user may interact with the virtual windows just as if the user were interacting with the respective desktop applications on the desktop computer.

In an example embodiment, the method maximizes a number of respective virtual windows created for each selected application by rendering as many of the selected applications as possible in the non-virtual reality application environment without any other applications obscuring the respective presentations of the selected applications prior to capturing the screenshot of the non-virtual reality application environment. In other words, as the method performs the process of creating the virtual window (i.e. rendering the desktop application in front of other applications on the computer, calculating coordinates, capturing a screenshot, cropping a picture, etc.), the method uses the API to intelligently arrange the selected desktop applications to fit on the desktop computer screen all at once (or, to fit as many of the currently executing desktop applications as possible). This allows the method to capture pictures of multiple desktop applications within a single screenshot, increasing the frequency, and therefore smoothness, with which new screenshots are integrated as virtual windows within the virtual reality presentation.

While the method is creating and rendering the virtual windows within the virtual reality presentation, the user may be interacting with the virtual reality application (via the virtual reality presentation in the virtual reality presentation device). In order to capture as many desktop applications as possible within a screenshot, the method may cover the desktop with the desktop applications. If the virtual reality application is also running on the desktop computer, these other desktop applications may cover/block the virtual reality application, making it difficult for the user to interact with the virtual reality application with a cursor. To prevent the desktop applications from blocking user interaction with the virtual reality application running on the desktop computer, the method utilizes the API to set the desktop applications to "input transparent" mode. Even if a desktop application is rendered as a large window blocking the entire virtual reality application running on the desktop computer, the user's cursor will "fall through" the desktop application window allowing the user to interact with the virtual reality application.

In an example embodiment, the method automatically imports any virtual reality application windows without user action. In other words, the method imports three dimensional graphics into the virtual reality presentation device without going through the "screenshot cropping" process. The method also automatically imports any two dimensional windows (produced by the virtual reality application) into the virtual reality presentation device without going through the "screenshot cropping process". As noted above, before the method imports the two dimensional windows (created by those desktop applications) into the virtual reality presentation device as virtual windows, a user may choose which desktop applications the method integrates as virtual windows into the virtual reality presentation device.

In an example embodiment, the method receives the user's interaction with the virtual window as user interaction with the application. In other words, as the user interacts with the virtual window within the virtual reality presentation device, the desktop application receives those interactions as though the user were interacting with the desktop application on the desktop computer. As the user experiences the virtual reality presentation, the desktop applications are integrated as virtual windows within the virtual reality presentation. The user may interact with the virtual windows just as they would the respective desktop applications running on the desktop computer. For example, the user may move and resize the virtual windows within the virtual reality presentation, select options, invoke commands, etc., as illustrated in FIG. 3.

In an example embodiment, when the method integrates the application within the virtual reality presentation by rendering an instance of the application as a virtual window, the method provides an element on the virtual window allowing the user to manipulate the virtual window within the virtual reality presentation device when the user maneuvers a cursor on the element. For example, the element may be a border around the virtual window. The user may resize the virtual window (i.e., the instance of the desktop application integrated into the virtual reality presentation) from within the virtual reality presentation device. The method renders a border around the virtual window. As the user positions a cursor over the border, the area of the border expands, making it easier for the user to select the border and/or the virtual window. In an example embodiment, the user may reposition the virtual window within the three dimensional space of the virtual reality presentation. The user may place a cursor over the border to select the virtual window, and then reposition the virtual window by dragging it to a new location within the virtual reality presentation. Moving virtual windows by selecting the respective borders of those virtual windows makes repositioning the virtual windows easier, especially when one virtual window is partially blocked by another virtual window.

In an example embodiment, each virtual window has a "movement drag" button which also allows the virtual window to be repositioned. The "movement drag" button, illustrated in FIG. 10, provides the user with visual clues to reposition the window.

In an example embodiment, each virtual window has a "scale" button, illustrated in FIG. 10, which allows users to increase or decrease the size of the virtual windows rendered within the virtual reality presentation. For example, the user may want to scale virtual windows small that are positioned close to the user, and scale virtual windows large that are positioned farther away from the user within the virtual reality presentation.

In an example embodiment, each virtual window has a "vertical resize" button and a "horizontal resize" button which allow users to resize the vertical and horizontal components of the virtual window individually.

In an example embodiment, each virtual window has a distance drag button. The user may select the distance drag button to move the virtual window in the third dimension (i.e., closer or farther within the virtual reality presentation). While a virtual window is being repositioned using the distance drag button, the user may direct their head (viewing the virtual window from within the virtual reality presentation device) in a different direction. For example, the user may direct their head from an original direction to a new direction (for example, "left" to "right"). The virtual window will remain in the user's "original direction" field of view while the user is directing their head in the "new direction" field of view. Further, the virtual window remains controlled by the cursor when the user selects the distance drag button to reposition the virtual window closer or farther. In other words, the user may select the distance drag button to move the virtual window closer or farther, and look in a new/different direction, while the virtual window remains in the original field of view while still being repositioned using the distance drag button.

In an example embodiment, the method reduces an area covered by the virtual window within the virtual reality presentation device when the user maneuvers the cursor off the element. For example, when the user's cursor is not over/on the border of the virtual window, the border returns to its smaller size, taking up less real estate within the virtual reality presentation.

In an example embodiment, the method receives user interaction with the virtual window to remove the virtual window from the virtual reality presentation while the application continues to execute within the non-virtual reality application environment. For example, each virtual window has a "dismiss" button, illustrated in FIG. 10, which allows the user to remove the virtual window from the virtual reality presentation. In an example embodiment, "dismissing" the virtual window does not close (i.e., cease execution of) the desktop application on the desktop computer.

In an example embodiment, when the method receives the user's interaction with the virtual window as user interaction with the application, the method receives selection of a command within the virtual window as the user's interaction (with the application or desktop application), and executes the command within the desktop application executing on the desktop computer. The method then renders a result of the command execution within the virtual window. For example, when the method detects that the user's cursor is over a virtual window within the virtual reality presentation device, the method calculates the respective coordinates for the desktop application (that is integrated as the virtual window within the virtual reality presentation device). The method uses the API to move the cursor (on the desktop computer) to the matching position with respect to the desktop application. In other words, as the user moves the cursor within the virtual window in the virtual reality presentation, the method moves the desktop cursor to match the user's movements on the desktop application executing on the desktop computer. In an example embodiment, when the user interacts with the virtual window, for example, "clicking" on a portion of the virtual window using the virtual cursor (for example, to simulate executing a command within the desktop application), the method obtains the coordinates for the location of the virtual cursor, maps those coordinates to the desktop application running on the desktop computer, and positions the desktop cursor from the virtual reality application (running on the desktop computer) onto the desktop application running on the desktop computer at the location of the mapped coordinates as illustrated in FIG. 4. The method then executes the command (that the user invoked when the user "clicked" on a portion of the virtual window using the virtual cursor) on the desktop application running on the desktop computer. Through the screen capture and cropping process, the method integrates an updated virtual window into the virtual reality presentation. That updated virtual window displays a result of the user's "click" event (i.e., simulating execution of a command). The method performs this update in real time so that, from the user's perspective, he/she "clicked" on a virtual window, and the virtual window reacted to the invocation of that command just as though the user had performed the "click" event on the desktop application running on the desktop computer. The method, therefore, allows seamless interaction between the desktop application running on the desktop computer, and the instance of that desktop application (integrated as a virtual window) running within the virtual reality application, by monitoring the user's actual cursor movements within the virtual window, and intelligently rendering a virtual cursor on the virtual window within the virtual reality presentation.

In another example embodiment, the method receives selection of a command within the application, executes the command within the application, and renders a result of the command execution within the virtual window. In other words, when the user interacts with the desktop application on the desktop computer, the method updates the virtual window within the virtual reality presentation device to reflect the user's interaction with the desktop application. In this example scenario, the user performed a "click" event on the desktop application running on the desktop computer, and the method updated the virtual window (using the screen capture and cropping process) to reflect the results of the user's "click" event on the desktop application.

In an example embodiment, the method detects a user cursor on the virtual window. The method then prioritizes the iterative rendering of the virtual window (that represents the selected application) over any other selected applications within the virtual reality presentation device. For example, when the user puts the cursor over the virtual window, the method changes the status of the virtual window to "priority input" mode. The method disables the "input transparent" mode on the virtual window so that the virtual window will receive input from the user via the virtual cursor. The method also renders the selected virtual window in front, and refreshes (i.e., performs the screen capture and cropping process) the selected virtual window as often as possible. The method calculates the three dimensional position of the cursor with respect to the virtual window, and draws a virtual cursor. From the user's viewpoint within the virtual reality presentation, the user moved the cursor over the virtual window and started interacting with that virtual window, while on the desktop the cursor moves from the virtual reality application to the desktop application (that is associated with the virtual window with which the user is currently interacting).

In an example embodiment, the method monitors the user's cursor movements within the virtual reality presentation as illustrated in FIG. 8. If the user moves the cursor outside the virtual window within the virtual reality presentation, on the desktop computer, the method repositions the desktop cursor over the virtual reality application. The desktop cursor is repositioned at coordinates on the virtual reality presentation that map to the coordinates of the edge of the virtual window within the virtual reality presentation. The virtual window then loses its "priority input" status. From the user's perspective, the user simply moved the cursor off the virtual window and repositioned it somewhere else within the virtual reality presentation.

In an example embodiment, as the user interacts with the virtual reality presentation within the virtual reality presentation device, the virtual reality application executes on the desktop computer. The user may interact with the virtual reality application on the desktop computer using a cursor. The method detects where the user positions the cursor on the virtual reality application on the desktop computer, calculates the position of the cursor position within the virtual reality application, maps the three dimensional position of the cursor within the virtual reality presentation (of the virtual reality application), and renders the cursor within the virtual reality presentation. The user may also interact with the desktop applications by interacting with the virtual windows (that each represent an instance of a desktop application executing) rendered within the virtual reality presentation.

In an example embodiment, the method allows users to interact with the virtual reality presentation with a cursor or hand motions/gestures (using hand tracking hardware), using virtual reality controllers, or an "interaction dot". Using hand-tracking hardware, the method renders a representation of the user's hands within the virtual reality presentation. If the user taps on a virtual window with their finger (within the virtual reality presentation), the method moves the cursor on the desktop computer to the desktop application as illustrated in FIGS. 13 and 14. The method uses the API to simulate a click/select event on the desktop application at the position where the user selected the virtual window, and then moves the cursor back to its original position. From the user's perspective, it appears that they clicked on the virtual window within the virtual reality presentation.

In an example embodiment, using "interaction dot" functionality, the user can select virtual windows using a joystick. Within the virtual reality presentation, the user sees a dot in the center of their vision. As the user looks at the dot on a virtual window within the virtual reality presentation, and presses the joystick, the method translates that selection to the desktop application. The method uses the API to simulate a click/select event on the desktop application at the position where the user selected the virtual window, and then moves the cursor back to its original position. From the user's perspective, it appears that they clicked on the virtual window within the virtual reality presentation. Thus, the user may interact with the virtual windows without having to remove their hands from the joystick.

In an example embodiment, when the method integrates the application within the virtual reality presentation by rendering an instance of the application as a virtual window, the method renders a two dimensional control associated with the application as a three dimensional control within the virtual window. The method provides three dimensional interaction with the three dimensional control within the virtual window as illustrated in FIGS. 7 and 10. Typically, three dimensional models designed for interaction within desktop applications are designed for two dimensional interaction. Controls within virtual reality presentations react to specific cursor events. For example, a radio control knob may be specified within a three dimensional model to be touchable on two rectangles (for example, two dimensional rectangles). One of the rectangles may specify "increase radio channel" when selected, while the other rectangle may specify "decrease radio channel" when selected. Three dimensional controls may have two dimensional interactions. A control rendered as, for example, an engine lever may increase engine thrust when the user drags the cursor upward (and decrease engine thrust when the user drags the cursor downwards). The mapping of "cursor up/down" to "engine thrust increase/decrease" may work well on the desktop applications which execute within a two dimensional environment, but translate poorly into the three dimensional environment of a virtual reality presentation. In a virtual reality presentation, the user may want to push the engine lever forward, flick a switch, and/or turn a knob. The method uses an advanced set of heuristics to estimate useful three dimensional interactions from two dimensional controls. In other words, the method takes two dimensional components/controls of desktop applications, and makes them usable within a three dimensional virtual reality environment with three dimensional interactions.

In an example embodiment, when there are two rectangles representing a control (as in the "increase radio channel" and "decrease radio channel" example explained above), the method combines the two rectangles into a single touchable area (where the control is represented by the touchable area) within the virtual reality presentation. The user is presented with an easy to use touchable area interface that can, for example, increase or decrease the radio channel. The touchable area interface may be represented within the virtual reality presentation as a slider, spinnable knob, etc., depending on the underlying geometry. When a selectable area (i.e., an area that may be selected by the user using a cursor) is on an area of animated geometry, the method animates the selectable area as illustrated in FIGS. 11 and 12. For example, an engine lever animates forward and backwards. The method calculates the extent of this animation, and infers a movement path for the lever. When the user touches the engine lever, the method shows the user that the lever can be moved forwards and backwards within the three dimensional space in the virtual reality presentation even when the virtual reality desktop application only specified that the lever responds to "up" and "down" movements of the cursor. The method also automatically converts more advanced controls (rendered as multiple rectangles) to intelligent touchable areas. For example, a radio knob composed of several cursor selectable rectangles (+0.1+1, −1, −0.1 radio frequency) is detected and combined into a tap-able keypad, twistable knob, or frequency slider.

In an example embodiment, the method converts the controls into intelligent touchable areas via component files as illustrated in FIG. 9. Virtual reality applications have component files that describe various components that are rendered within the virtual reality presentation. The components are described relative to the other components (at coordinates) in the virtual reality presentation, and with information related to the positions the component can be manipulated to. For example, a control, such as a knob may have information that it can rotate from X to Y degrees. The method captures this information from the component files and simulates the extremes of the information (i.e., rotating the knob all the way from X to Y degrees), and uses that to calculate the positions the user may want to move that control. The component file does not specify how a user can move the control, only how the values of the control change as the user manipulates the cursor. The method calculates the values of the controls as the user manipulates the control within the three dimensional virtual reality presentation.

In an example embodiment, at 203, the method links a plurality of virtual reality presentations each comprising at least one virtual window. Each respective user of each of the plurality of virtual reality presentations may view the virtual windows within any of the plurality of virtual reality presentations. For example, by detecting commands normally issued by controls within the virtual reality application, and transferring them over network packets, the method allows multiple users to interact with one shared virtual reality presentation over the Internet. Each user runs the virtual reality application on their own computer, and uses their own virtual reality presentation device. The method allows multiple users to link their view of the virtual reality presentation together so that all of the users are viewing the same virtual reality presentation. Thus, when one user, for example, manipulates a control within the virtual reality presentation, all users see the manipulation of the control within their own virtual reality presentation device.

In an example embodiment, when the method integrates the application within the virtual reality presentation by rendering an instance of the application as a virtual window, the method reads image data residing in computer memory to create the virtual window. For example, the method may read the image data from a graphics card on the desktop computer (or any computer). The method may also read the image data from computer memory (such as RAM accessible by the computer's Central Processing Unit (CPU), or memory associated with a graphics card on a computer). As noted above using the webcam example, a virtual window is not necessarily generated from a desktop application. Instead, the method may draw the two dimensional image of the virtual window directly from a graphics card residing on the computer on which the virtual reality application is executing. The method uses the graphics card and graphics API to draw images, text, and/or animates to a single two dimensional image that resides on the graphics card. The virtual window may be manipulated (i.e., scaled, moved, etc.), and accepts input just like a virtual window that was generated from a desktop application. When a user interacts with the virtual window (such as clicking on a location of the virtual window), the method determines the two dimensional coordinates of the location, and transmits that click event back to the application from which the virtual window was generated. Thus, the virtual window is communicating with a two dimensional and three dimensional system, yet not taking up display space on a desktop computer.

In an example embodiment, the application that generated the virtual window may be a desktop application, the virtual reality application, or any other type of application. When a user interacts with a virtual window (such as "clicking" at a location within the virtual window), the method calculates the coordinates of that location, and transmits that information back to the application from which the virtual window was generated (i.e., the desktop application, the virtual reality application, the webcam application, etc.). In an example embodiment, the virtual reality application may generate a virtual window, for example, of a checklist. As the user "clicks" (i.e., selects) items in the checklist, the method obtains the location(s) of the checked off items within the virtual window checklist, and transmits that information back to the virtual reality application, where the virtual reality application updates the virtual window checklist, and renders the updated virtual window checklist with the virtual reality representation. In this example scenario, the updated virtual window may now show the items that the user selected as "checked off" within the checklist. In another example scenario, the virtual reality application may perform some other task in response to the user's interaction with the virtual window. For example, if the user interacted with the virtual window, and selected "Create XYZ window", in response to the user's selection, the virtual reality application would create the "XYZ" window and render that window within the virtual reality representation.

According to one embodiment disclosed herein, a method links a plurality of virtual reality presentations. Each respective user of each of the plurality of virtual reality presentations can view at least two of the plurality of virtual reality presentations, for example, their own executing within their own virtual reality presentation device, and a virtual reality presentation that is executing in another user's virtual reality presentation device. In another example embodiment, each respective user of each of the plurality of virtual reality presentations may view the virtual reality presentations within any of the plurality of virtual reality presentations. For example, by detecting commands normally issued by controls within the virtual reality application, and transferring them over network packets, the method allows multiple users to interact with one shared virtual reality presentation over the Internet. Each user runs the virtual reality application on their own computer, and uses their own virtual reality presentation device. The method allows multiple users to link their view of the virtual reality presentation together so that all of the users are viewing the same virtual reality presentation. Thus, when one user, for example, manipulates a control within the virtual reality presentation, all users see the manipulation of the control within their own virtual reality presentation device. FIG. 8 illustrates multiple users interacting with the same virtual reality representation.

According to one embodiment disclosed herein, in a method for rendering controls within a virtual reality presentation, the method renders a two dimensional control associated with an application as a three dimensional control within the virtual reality presentation. The method provides three dimensional interaction with the three dimensional control within the virtual reality presentation. The method provides three dimensional interaction with the three dimensional control within the virtual window as illustrated in FIGS. 7 and 10. Typically, three dimensional models designed for interaction within desktop applications are designed for two dimensional interaction. Controls within virtual reality presentations react to specific cursor events. For example, a radio control knob may be specified within a three dimensional model to be touchable on two rectangles (for example, two dimensional rectangles). One of the rectangles may specify "increase radio channel" when selected, while the other rectangle may specify "decrease radio channel" when selected. Three dimensional controls may have two dimensional interactions. A control rendered as, for example, an engine lever may increase engine thrust when the user drags the cursor upward (and decrease engine thrust when the user drags the cursor downwards). The mapping of "cursor up/down" to "engine thrust increase/decrease" may work well on the desktop applications which execute within a two dimensional environment, but translate poorly into the three dimensional environment of a virtual reality presentation. In a virtual reality presentation, the user may want to push the engine lever forward, flick a switch, and/or turn a knob. The method uses an advanced set of heuristics to estimate useful three dimensional interactions from two dimensional controls. In other words, the method takes two dimensional components/controls of desktop applications, and makes them usable within a three dimensional virtual reality environment with three dimensional interactions.

A method and system for integrating an application within a virtual reality presentation have been disclosed.

A method and system for rendering controls within a virtual reality presentation have been disclosed.

A method and system for linking a plurality of virtual reality presentations have been disclosed.

Although embodiments disclosed herein have been described in accordance with the embodiments shown, one of ordinary skill in the art will readily recognize that there could be variations to the embodiments and those variations would be within the spirit and scope of embodiments disclosed herein. Accordingly, many modifications may be made by one of ordinary skill in the art without departing from the spirit and scope of the appended claims.

What is claimed is:

1. A computer program product for integrating an application within a virtual reality presentation, the computer program product comprising: a non-transitory computer readable memory device having computer readable program code embodied therewith, the computer readable program code configured to:

invoke the virtual reality presentation in a virtual reality presentation device, wherein the virtual reality presentation is an instance of a virtual reality application executing in the virtual reality presentation device;

invoke a non-virtual reality application within a non-virtual reality application environment, comprising any application that is not presently executing within the virtual reality presentation device; and integrate the non-virtual reality application within the virtual reality presentation by rendering an instance of the application as a virtual window layered on the virtual reality presentation, comprising:

rendering an instance of the non-virtual reality application as a virtual window layered on the virtual reality presentation comprising:
  a) rendering a list of applications within the virtual reality presentation device;
  b) receiving from a user, selection of at least one selected application from the rendered list of applications;
  c) integrating the at least one selected application within the virtual reality presentation by rendering a respective instance of the at least one selected application as a respective virtual window layered on the virtual reality presentation comprising:
    1) iteratively rendering the at least one selected application in the non-virtual reality application environment without any other application obscuring presentation of the selected application,
    2) capturing a screenshot of the non-virtual reality application environment;
    3) optimizing a spacing between a number of respective virtual windows created for each selected application to fit into a single image capture shown in a virtual reality application environment, comprising pre-arranging and rendering one or more selected application windows in a non-virtual reality environment prior to capturing a screenshot of the non-virtual reality application environment such that none of the non-selected application windows obscures the respective presentations of the one or more selected application windows, thereby increasing the frequency and smoothness with which new screenshots are integrated as virtual windows within the virtual reality application environment;
    4) cropping the screenshot to frame only the presentation of the selected application within the non-virtual reality application environment, and
    5) iteratively rendering the cropped presentation of the selected application within the virtual reality presentation as a virtual window;
    6) providing the user with real time interaction with said selected application within the virtual reality presentation, comprising:
      i) detecting a user cursor on the virtual window,
      ii) changing a status of the virtual window from input transparent mode to priority input mode, and
      iii) prioritizing the iterative rendering of the selected at least one application over any other selected applications by increasing the refresh rate of the selected application within the virtual reality presentation device.

2. A system comprising: a processor; and a non-transitory computer readable memory device, having computer readable program code embodied therewith, the computer readable program code configured to:

invoke the virtual reality presentation in a virtual reality presentation device, wherein the virtual reality presentation is an instance of a virtual reality application executing in the virtual reality presentation device;

invoking a non-virtual reality application within a non-virtual reality application environment, comprising any application that is not presently executing within the virtual reality presentation device; and integrate the non-virtual reality application within the virtual reality presentation by rendering an instance of the application as a virtual window layered on the virtual reality presentation, comprising:

rendering an instance of the non-virtual reality application as a virtual window layered on the virtual reality presentation comprising:
  d) rendering a list of applications within the virtual reality presentation device:
  e) receiving from a user, selection of at least one selected application from the rendered list of applications;
  f) integrating the at least one selected application within the virtual reality presentation by rendering a respective instance of the at least one selected application as a respective virtual window layered on the virtual reality presentation comprising:
    7) iteratively rendering the at least one selected application in the non-virtual reality application environment without any other application obscuring presentation of the selected application,
    8) capturing a screenshot of the non-virtual reality application environment:
    9) optimizing a spacing between a number of respective virtual windows created for each selected application to fit into a single image capture shown in a virtual reality application environment, comprising pre-arranging and rendering one or more selected application windows in a non-virtual reality environment prior to capturing a screenshot of the non-virtual reality application environment such that none of the non-selected application windows obscures the respective presentations of the one or more selected application windows, thereby increasing the frequency and smoothness with which new screenshots are integrated as virtual windows within the virtual reality application environment;
    10) cropping the screenshot to frame only the presentation of the selected application within the non-virtual reality application environment, and
    11) iteratively rendering the cropped presentation of the selected application within the virtual reality presentation as a virtual window;
    12) providing the user with real time interaction with said selected application within the virtual reality presentation, comprising:
      iv) detecting a user cursor on the virtual window, v) changing a status of the virtual window from input transparent mode to priority input mode, and vi) prioritizing the iterative rendering of the selected at least one application over any other selected applications by increasing the refresh rate of the selected application within the virtual reality presentation device.

3. The system of claim 2 further configured to:

render a list of applications within the virtual reality presentation device;

receive, from a user, selection of at least one selected application from the list of applications; and integrate the at least one selected application within the virtual reality presentation by rendering a respective instance of the at least one selected application as a respective virtual window layered on the virtual reality presentation by:

for each of the at least one selected application:

render the selected application in the non-virtual reality application environment without any other application obscuring a presentation of the selected application;

capture a screenshot of the non-virtual reality application environment;

crop the screenshot to frame only the presentation of the selected application within the non-virtual reality application environment; and render the cropped presentation of the selected application within the virtual reality presentation as the virtual window.

4. The method of claim 2 wherein cropping the screenshot to frame only the presentation of the selected application within the non-virtual reality application environment comprises:

obtaining coordinates of the presentation of the selected application with respect to the non-virtual reality application environment; and cropping the screenshot using the coordinates to frame only the presentation of the selected application.

5. The method of claim 2 further comprising:

receiving a user's interaction with the virtual window as user interaction with the application.

6. The method of claim 5 wherein receiving the user's interaction with the virtual window as user interaction with the application comprises:

receiving selection of a command within the virtual window as the user's interaction;

executing the command within the application; and rendering a result of the command execution within the virtual window.

7. The method of claim 2 further comprising:

receiving selection of a command within the application;

executing the command within the application; and rendering a result of the command execution within the virtual window.

8. The method of claim 2 wherein integrating the application within the virtual reality presentation by rendering an instance of the application as a virtual window comprises:

providing an element on the virtual window allowing the user to manipulate the virtual window within the virtual reality presentation device when the user maneuvers a cursor on the element; and reducing an area covered by the virtual window within the virtual reality presentation device when the user maneuvers the cursor off the element.

9. The method of claim 2 wherein integrating the application within the virtual reality presentation by rendering an instance of the application as a virtual window comprises:

rendering a two dimensional control associated with the application as a three dimensional control within the virtual window; and providing three dimensional interaction with the three dimensional control within the virtual window.

10. The method of claim 2 wherein integrating the application within the virtual reality presentation by rendering an instance of the application as a virtual window comprises:

reading image data residing in computer memory to create the virtual window.

11. The method of claim 2 further comprising:

receiving user interaction with the virtual window to remove the virtual window from the virtual reality presentation while the application continues to execute within the non-virtual reality application environment.

12. The method of claim 2 further comprising:

linking a plurality of virtual reality presentations each comprising at least one virtual window, wherein each respective user of each of the plurality of virtual reality presentations can view the at least one virtual window within any of the plurality of virtual reality presentations.

13. A method of integrating an application within a virtual reality presentation, the method comprising:

invoking the virtual reality presentation in a virtual reality presentation device, wherein the virtual reality presentation is an instance of a virtual reality application executing in the virtual reality presentation device;

invoking a non-virtual reality application within a non-virtual reality application environment comprising any application that is not presently executing within the virtual reality presentation device; and integrating the non-virtual reality application within the virtual reality presentation comprising:

rendering an instance of the non-virtual reality application as a virtual window layered on the virtual reality presentation comprising:

a. rendering a list of applications within the virtual reality presentation device;

b. receiving from a user, selection of at least one selected application from the rendered list of applications;

c. integrating the at least one selected application within the virtual reality presentation by rendering a respective instance of the at least one selected application as a respective virtual window layered on the virtual reality presentation comprising:

1. iteratively rendering the at least one selected application in the non-virtual reality application environment without any other application obscuring presentation of the selected application, 2. capturing a screenshot of the non-virtual reality application environment;

3. optimizing a spacing between a number of respective virtual windows created for each selected application to fit into a single image capture shown in a virtual reality application environment, comprising pre-arranging and rendering one or more selected application windows in a non-virtual reality environment prior to capturing a screenshot of the non-virtual reality application environment such that none of the non-selected application windows obscures the respective presentations of the one or more selected application windows, thereby increasing the frequency and smoothness with which new screenshots are integrated as virtual windows within the virtual reality application environment;

4. cropping the screenshot to frame only the presentation of the selected application within the non-virtual reality application environment, and 5. iteratively rendering the cropped presentation of the selected application within the virtual reality presentation as a virtual window;

6. providing the user with real time interaction with said selected application within the virtual reality presentation, comprising:
    i) detecting a user cursor on the virtual window,
    ii) changing a status of the virtual window from input transparent mode to priority input mode, and
    iii) prioritizing the iterative rendering of the selected at least one application over any other selected applications by increasing the refresh rate of the selected application within the virtual reality presentation device.

14. The method of claim 13 further comprising:
receiving user interaction with the virtual window to remove the virtual window from the virtual reality presentation while the application continues to execute within the non-virtual reality application environment.

15. The method of claim 13 further comprising:
linking a plurality of virtual reality presentations each comprising at least one virtual window, wherein each respective user of each of the plurality of virtual reality presentations can view the at least one virtual window within any of the plurality of virtual reality presentations.

16. The method of claim 13 wherein cropping the screenshot to frame only the presentation of the selected application within the non-virtual reality application environment comprises:
    obtaining coordinates of the presentation of the selected application with respect to the non-virtual reality application environment; and
    cropping the screenshot using the coordinates to frame only the presentation of the selected application.

17. The method of claim 13 further comprising:
receiving a user's interaction with the virtual window as user interaction with the application.

18. The method of claim 17 wherein receiving the user's interaction with the virtual window as user interaction with the application comprises:
    receiving selection of a command within the virtual window as the user's interaction;
    executing the command within the application; and
    rendering a result of the command execution within the virtual window.

19. The method of claim 13 further comprising:
    receiving selection of a command within the application;
    executing the command within the application; and
    rendering a result of the command execution within the virtual window.

20. The method of claim 13 wherein integrating the application within the virtual reality presentation by rendering an instance of the application as a virtual window comprises:
    providing an element on the virtual window allowing the user to manipulate the virtual window within the virtual reality presentation device when the user maneuvers a cursor on the element; and
    reducing an area covered by the virtual window within the virtual reality presentation device when the user maneuvers the cursor off the element.

21. The method of claim 13 wherein integrating the application within the virtual reality presentation by rendering an instance of the application as a virtual window comprises:
    rendering a two dimensional control associated with the application as a three dimensional control within the virtual window; and
    providing three dimensional interaction with the three dimensional control within the virtual window.

22. The method of claim 13 wherein integrating the application within the virtual reality presentation by rendering an instance of the application as a virtual window comprises:
    reading image data residing in computer memory to create the virtual window.

23. The method of claim 13 wherein the steps of iteratively rendering the selected application, capturing, cropping and iteratively rendering the cropped screen shot provides the user with said real time interaction within the virtual reality presentation device while the at least one selected application executes within the non-virtual reality application environment in response to the user's real time interaction.

* * * * *